United States Patent
Lalanne-Magne et al.

(12)

(10) Patent No.: US 7,488,862 B2
(45) Date of Patent: *Feb. 10, 2009

(54) PROCESS FOR THE GAS-PHASE (CO-)POLYMERISATION OF OLEFINS IN A FLUIDISED BED REACTOR

(75) Inventors: Claudine Lalanne-Magne, St Mitre les Remparts (FR); Caroline Royer-Mladenov, Puteaux (FR); Martine Schneider, Compiegne (FR)

(73) Assignee: Ineos Europe Limited, Hampshire (GB)

( * ) Notice: Subject to any disclaimer, the term of this patent is extended or adjusted under 35 U.S.C. 154(b) by 480 days.

This patent is subject to a terminal disclaimer.

(21) Appl. No.: 10/509,884

(22) PCT Filed: Apr. 1, 2003

(86) PCT No.: PCT/GB03/01419

§ 371 (c)(1),
(2), (4) Date: Oct. 4, 2004

(87) PCT Pub. No.: WO03/082935

PCT Pub. Date: Oct. 9, 2003

(65) Prior Publication Data

US 2005/0256356 A1 Nov. 17, 2005

(30) Foreign Application Priority Data

Apr. 3, 2002 (EP) .................................. 02358007

(51) Int. Cl.
*C07C 2/01* (2006.01)
*C08F 4/44* (2006.01)

(52) U.S. Cl. ........................ 585/521; 585/522; 585/523; 585/524; 526/125.2; 526/125.7; 526/144

(58) Field of Classification Search ................. 585/521, 585/522, 524, 523; 526/125.7, 125.2, 144
See application file for complete search history.

(56) References Cited

U.S. PATENT DOCUMENTS 5,990,251 A   11/1999   Gelus ..................... 526/125.7
6,887,957 B2 *  5/2005  Chabrand et al. ........... 526/144

FOREIGN PATENT DOCUMENTS

| EP | 0 529 977 A1 | 3/1993 |
| EP | 0 703 246 A1 | 3/1996 |
| WO | WO 00/24789 | 5/2000 |
| WO | WO 00/58374 | 10/2000 |
| WO | WO 02/28919 A1 | 4/2002 |

* cited by examiner

*Primary Examiner*—Glenn Caldarola
*Assistant Examiner*—In Suk Bullock
(74) *Attorney, Agent, or Firm*—Nixon & Vanderhye

(57) ABSTRACT

The present invention relates to a process for the gas-phase (co-)polymerisation of olefins in a fluidised bed reactor using a Ziegler-Natta type catalyst characterised in that the polymerisation is performed in the presence of a monohalogenated hydrocarbon compound.

12 Claims, No Drawings

PROCESS FOR THE GAS-PHASE (CO-)POLYMERISATION OF OLEFINS IN A FLUIDISED BED REACTOR

The present invention relates to a process for the (co-)polymerisation of olefins using a Ziegler-Natta type catalyst, in particular to a process for the gas-phase (co-)polymerisation of olefins in a fluidised bed reactor using a Ziegler-Natta type catalyst.

The present invention also relates to a process for increasing the polymerisation activity of a Ziegler-Natta type catalyst during the (co-)polymerisation of olefins using said Ziegler-Natta type catalyst, in particular during the gas-phase (co-)polymerisation of olefins in a fluidised bed reactor using said Ziegler-Natta type catalyst. The present invention further relates to a process for improving the processability of the polymers obtained during the (co-)polymerisation of olefins using said Ziegler-Natta type catalyst, in particular during the gas-phase (co-)polymerisation of olefins in a fluidised bed reactor using said Ziegler-Natta type catalyst.

Processes for the co-polymerisation of olefins in the gas phase are well known in the art. Such processes can be conducted for example by introducing the gaseous monomer and comonomer into a stirred and/or fluidised bed comprising polyolefin and a catalyst for polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer, which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst would become inactive or the bed would begin to melt. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas is used to supply the monomer to the bed, to fluidise the bed, and to maintain the bed at the desired temperature. Monomers consumed by the polymerisation reaction are normally replaced by adding make up gas or liquid to the polymerisation zone or reaction loop.

It is well known that Ziegler-Natta type catalysts can advantageously be used for the (co-)polymerisation of olefins, particularly in slurry processes as well as in gas phase processes.

In the course of their research developments, the applicants have now found a new method for increasing up to an unexpected level the polymerisation activity of a Ziegler-Natta type catalyst during the (co-)polymerisation of olefins using said Ziegler-Natta type catalyst, in particular during the gas-phase (co-)polymerisation of olefins in a fluidised bed reactor using said Ziegler-Natta type catalyst, especially during the gas-phase (co-)polymerisation of ethylene in a fluidised bed reactor using said Ziegler-Natta type catalyst. What is also unexpected from these huge activity increases is that the present method is absolutely not detrimental and rather beneficial to a normal and efficient process behaviour of industrial plants; in this respect, the Applicants have found that their method can be successfully applied for increasing plant throughput while avoiding the usual fouling problems the man skilled in the art would expect to face at these high activities.

Simultaneously, the applicants have found that this new method allows to improve the processability of the produced polymers obtained during the copolymerisation of olefins using a Ziegler-Natta type catalyst, in particular during the gas-phase copolymerisation of olefins in a fluidised bed reactor using a Ziegler-Natta type catalyst, especially during the gas-phase copolymerisation of ethylene with another olefin in a fluidised bed reactor using said Ziegler-Natta type catalyst.

This method is especially valuable for the industrial plants that will be now able by keeping their actual Ziegler-Natta type catalyst to increase significantly their polymer production.

In accordance with the present invention, there has now been found a process for the gas-phase (co-)polymerisation of olefins in a fluidised bed reactor using a Ziegler-Natta type catalyst, said process comprising the addition into the reactor of an organoaluminium cocatalyst and of a monohalogenated hydrocarbon compound, wherein the molar ratio of the monohalogenated hydrocarbon compound to the cocatalyst is comprised between 0.02 and 0.2, preferably between 0.02 and 0.15.

The organoaluminium cocatalyst and/or the monohalogenated hydrocarbon compound can be added at any location of the fluidised bed polymerisation system, e.g. in the reactor itself, below the fluidisation grid or above the grid in the fluidised bed, above the fluidised bed, in the powder disengagement zone of the reactor (also named velocity reduction zone), anywhere in the reaction loop or recycle line, in the fines recycle line (when a cyclone is used). According to an embodiment of the present invention, the organoaluminium cocatalyst and/or the monohalogenated hydrocarbon compound are added directly into the fines recycle line (when a cyclone is used), or directly into the polymerisation zone, more preferably directly into the fluidised bed, ideally in the lower part of the bed (below half bed height). For the purposes of the present invention and appended claims, the polymerisation zone means the reaction zone consisting of the fluidised bed itself, and in the region above the fluidised bed which consists of the powder disengagement zone and/or the velocity reduction zone. According to another embodiment of the present invention, the organoaluminium cocatalyst and/or the monohalogenated hydrocarbon compound are added at at least two different locations of the fluidised bed polymerisation system. It is preferred according to the present invention that the organoaluminium cocatalyst and/or the monohalogenated hydrocarbon compound are not added in admixture with the catalyst. According to another embodiment, the organoaluminium cocatalyst and/or the monohalogenated hydrocarbon compound are added into the fluidised bed polymerisation system through the well-known BP high productivity nozzles, which protrude through the fluidisation grid directly into the fluidised bed (see e.g. WO9428032, the content of which is incorporated hereby).

The monohalogenated hydrocarbon compound may be a chlorinated or brominated hydrocarbon. It may be a monohalogenated hydrocarbon of general formula R—X in which R denotes an alkyl group containing from 1 to 10, preferably from 2 to 7 carbon atoms, an aralkyl or aryl group containing from 6 to 14, preferably from 6 to 10 carbon atoms, and X denotes a halogen atom such as chlorine or bromine. Preferably, the monohalogenated hydrocarbon compound is chosen amongst methylene chloride, ethyl chloride, propyl chloride, butyl chloride, pentyl chloride, hexyl chloride and heptyl chloride. Butyl chlorides are more preferred, n-butyl chloride being the most preferred monohalogenated hydrocarbon compound.

According to a preferred embodiment of the present invention, the invention monohalogenated hydrocarbon compound is diluted in a conventional diluent. Suitable diluents include aromatic, paraffin and cycloparaffin compounds. The diluents are preferably selected from among benzene, toluene, xylene, cyclohexane, fuel oil, isobutane, pentane, kerosene and mixtures thereof for instance. When a diluent is used, the invention monohalogenated hydrocarbon compound is preferably present in an amount comprised between 0.001 and 2 mole/l of diluent, preferably between 0.005 and 1 mole/l of diluent. Said diluent is preferably butane, pentane or hexane. The process according to the present invention is particularly suitable for the manufacture of polymers in a continuous gas fluidised bed process.

In an advantageous embodiment of this invention, the polymer is a polyolefin preferably copolymers of ethylene and/or propylene and/or butene. Preferred alpha-olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or more C4-C8 alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the C4-C8 monomer are dec-1-ene and ethylidene norbornene. According to a preferred embodiment, the process of the present invention preferably applies to the manufacture of polyolefins in the gas phase by the copolymerisation of ethylene with but-1-ene and/or hex-1-ene and/or 4-methylpent-1-ene.

The process according to the present invention may particularly be used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

The process is particularly suitable for polymerising olefins at an absolute pressure of between 0.5 and 6 MPa and at a temperature of between 30° C. and 130° C. For example for LLDPE production the temperature is suitably in the range 75-105° C. and for HDPE the temperature is typically 80-120° C. depending on the activity of the catalyst used and the polymer properties desired.

The polymerisation is preferably carried out continuously in a vertical fluidised bed reactor according to techniques known in themselves and in equipment such as that described in French Patent Application 0004757 (filing number), European patent application EP-0 855 411, French Patent No. 2,207,145 or French Patent No. 2,335,526.

The process of the invention is particularly well suited to industrial-scale reactors of very large size.

In one embodiment the reactor used in the present invention is capable of producing greater than 300 kg/h to about 80,000 kg/h or higher of polymer, preferably greater than 10,000 kg/h.

The polymerisation reaction is carried out in the presence of a Ziegler-Natta type catalyst.

Examples of Ziegler-Natta type catalysts according to the present invention are typically those consisting of a solid catalyst essentially comprising a compound of a transition metal and of a cocatalyst comprising an organic compound of a metal (i.e. an organometallic compound, for example an alkylaluminium compound). These high-activity Ziegler-Natta type catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of transition metal complexes, magnesium complexes and halogen containing complexes. Examples thereof can be found, e.g. in U.S. Pat. No. 4,260,709, EP0598094, EP0099774 and EP0175532. The process is also particularly suitable for use with Ziegler catalysts supported on silica, e.g. in WO9309147, WO9513873, WO9534380, WO9905187 and EP998503. For the purpose of the present description and appended claims, Ziegler-Natta type catalysts specifically exclude the metallocene catalysts.

According to a preferred embodiment of the present invention the Ziegler-Natta type catalyst consists of a catalyst precursor and of a cocatalyst, said catalyst precursor comprising a catalyst carrier material, an alkylmagnesium compound, a transition metal compound of Groups 4 or 5 of the Periodic table of the elements, and an optional electron donor.

The catalyst carrier materials that can be used in the present invention are solid, porous carrier materials such as e.g. silica, alumina and combinations thereof. They are preferably amorphous in form. These carriers may be in the form of particles having a particle size of from about 0.1 micron to about 250 microns, preferably from 10 to about 200 microns, and most preferably from about 10 to about 80 microns. The preferred carrier is silica, preferably silica in the form of spherical particles e.g. spray dried silica.

The internal porosity of these carriers may be larger than 0.2 cm$^3$/g, e.g. larger than about 0.6 cm$^3$/g. The specific surface area of these carriers is preferably at least 3 m$^2$/g, preferably at least about 50 m$^2$/g, and more preferably from, e.g. about 150 to about 1500 m$^2$/g. It is desirable to remove physically bound water from the carrier material prior to contacting this material with water-reactive magnesium compounds. This water removal may be accomplished by heating the carrier material to a temperature from about 100° C. to an upper limit of temperature represented by the temperature at which change of state or sintering occurs. A suitable range of temperatures may, thus, be from about 100° C. to about 850° C. Preferably, said temperature is comprised between 500° C. and 800° C.

Silanol groups represented by a presence of Si—OH groups in the carrier are present when the carrier is contacted with water-reactive magnesium compounds in accordance with the present invention. These Si—OH groups are usually present at about 0.3 to about 1.2 mmoles of OH groups per gram of carrier, preferably at about 0.3 to about 0.7 mmoles of OH groups per gram of carrier. Excess OH groups present in the carrier may be removed by heating the carrier for a sufficient time at a sufficient temperature to accomplish the desired removal. For example, the silica carrier, prior to the use thereof in the first catalyst synthesis step has been dehydrated by fluidising it with nitrogen or air and heating at least at about 600° C. for at least about 5 hours to achieve a surface hydroxyl group concentration of less than about 0.7 mmoles per gram (mmoles/g).

The surface hydroxyl concentration (OH) of silica may be determined according to J. B. Peri and A. L. Hensley, Jr., J. Phys. Chem., 72(8), 2926 (1968).

The silica of the most preferred embodiment is a material marketed under the tradename of ES70 by Crosfield and having a surface area of 280 m$^2$/g and a pore volume of 1.6 ml/g. Another preferred silica is a high surface area, amorphous silica (surface area=300 m$^2$/g; pore volume of 1.65 cm$^3$/g), and it is a material marketed under the trade name of Davison 952 by the Davison Chemical Division of W. R. Grace and Company.

The alkylmagnesium compound is preferably a dialkylmagnesium having the empirical formula RMgR$^1$ where R and R$^1$ are the same or different $C_2$-$C_{12}$ alkyl groups, preferably $C_2$-$C_8$ alkyl groups, more preferably $C_4$-$C_8$ alkyl groups, and most preferably both R and R$^1$ are butyl groups. Butylethylmagnesium, butyloctylmagnesium and dibutylmagnesium are preferably used according to the present invention, dibutylmagnesium being the most preferred.

The transition metal compound is preferably a titanium compound, preferably a tetravalent titanium compound. The most preferred titanium compound is titanium tetrachloride. Mixtures of such titanium metal compounds may also be used.

The optional electron donor is preferably a silane compound, more preferably a tetraalkyl orthosilicate having the formula Si(OR)$_4$ wherein R is preferably a $C_1$-$C_6$ alkyl compound. Typical examples of tetraalkyl orthosilicate include tetramethoxysilane, tetraethoxysilane, tetraisopropoxysilane, tetrapropoxysilane, tetrabutoxysilane, tetraethoxysilane and tetrabutoxysilane being the two most preferred ones.

The cocatalyst which can be used is preferably an organometallic compound of a metal from groups I to III of the Periodic Classification of the Elements, such as, for example, an organoaluminum compound, e.g. dimethylaluminiumchloride, trimethylaluminium, triisobutylaluminium or triethylaluminium. Triethylaluminium is preferably used.

The catalyst can be used as it is or optionally in the form of a coated catalyst or prepolymer containing, for example, from 10$^{-5}$ to 3, preferably from 10$^{-3}$ to 10$^{-1}$, millimoles of titanium per gram of polymer. The process of the invention is particularly suited to the use of a non-prepolymerized catalyst, preferably to the direct introduction of a titanium magnesium silica supported catalyst.

The monohalogenated hydrocarbon compound of the present invention is preferably added to the reactor in an amount such that the resulting catalyst activity (gram of polymer per gram of transition metal per hour) presents an increase of at least 30%, preferably at least 50%, more preferably at least 80%, when compared with exactly the same process conditions in the absence of said monohalogenated hydrocarbon compound.

According to a preferred embodiment of the present invention, the monohalogenated hydrocarbon compound is added to the reactor in an amount comprised between 0.1 to 40 moles of monohalogenated hydrocarbon compound per mole of transition metal of catalyst introduced into the reactor, preferably in a mole ratio comprised between 0.2 and 40, preferably 0.2 and 10, more preferably 0.25 and 5. Said mole ratio or mole of monohalogenated hydrocarbon compound per mole of transition metal catalyst can be measured by any appropriate method; for example, it can be measured through the measurement of the transition metal content of the polymer powder.

The monohalogenated hydrocarbon compound can be added continuously or intermittently to the reactor. In the continuous gas phase polymerisation process according to the present invention, it is preferred to add continuously the monohalogenated hydrocarbon compound to the reactor. Sufficient monohalogenated hydrocarbon compound is added to maintain its concentration at the desired level.

The following non-limiting examples illustrate the present invention.

EXAMPLES

Example 1 a. Catalyst Preparation

The catalyst is a silica supported catalyst which is the same as one disclosed in the comparative example 1 of WO99/05187 (1 mmol DBM/g silica, 0.44 mmol TEOS/g silica, 1 mmol TiCl4/g silica)

b. Manufacture of a Copolymer of Ethylene and 1-butene

The operation was carried out in a gas phase polymerisation reactor consisting essentially of a vertical cylinder of 74 cm diameter and with a height of 6 m, with a disengagement chamber above it, fitted in its lower part with a fluidisation grid and a recycling conduit connecting the top of the disengagement chamber to the lower part of the reactor, the recycling conduit being equipped with a cyclone, a heat exchanger, a separator, a compressor and feed conduits for ethylene, for 1-butene, for hydrogen and for pentane. The reactor was also equipped with a feed conduit for catalyst and a conduit for drawing off copolymer.

The reactor contained a fluidised bed of particles of polymer being formed, which had a height of 3.5 m and through which passed a stream of reaction gas mixture, which had an upward velocity of 40 cm/s, an absolute pressure of 2.1 MPa and a temperature of 105° C.

The reaction gas mixture comprised, by volume, 47.6% of ethylene, 0.4% of 1-butene, 16.3% of hydrogen, 9.6% of pentane and 26.1% of nitrogen.

The reactor was fed with catalyst prepared previously at a rate of 14 g/h. It was fed separately with triethylaluminium at a continuous rate of 170 mmol/h. Furthermore, it was fed separately with n-butyl chloride at a continuous rate of 25 mmol/h. The n-butyl chloride injection point was located in the gas-recycling conduit. The molar ratio of the quantities of n-butyl chloride and triethylaluminium introduced into the reactor was kept at 0.15.

Under these conditions a copolymer free from agglomerate was drawn off at a rate of 141 kg/h, which had a density (non annealed) of 0.959 g/cm3, a titanium content of 3.4 ppm, a Melt-Index MI2.16 of 7.75 g/10 minutes. The catalyst activity was 425 g of polymer per millimole of titanium per hour of reaction and per 0.1 MPa of ethylene pressure.

Example 2 a. Catalyst Preparation

All manipulations were conducted under a nitrogen atmosphere. Into a 240 L reactor was placed 12 kg of Ineos ES70 silica, which was previously dried under a nitrogen purge at 500° C. during 5 hours. Hexane (60 L) was added to the silica. Dibutylmagnesium (16.2 mol) was added to the stirred slurry at 50.degree. C. and stirring was continued for one hour. Tetrabutyl orthosilicate (TBOS, 12 mol) was added to the slurry (50.degree. C.) and stirring was continued for two hour. TiCl4 (19.2 mol) was added to the reactor (50.degree) and stirring was continued for an additional hour. Hexane was then removed by drying under vacuum conditions at about 40° C. Yield was 20.4 kg and the weight percent of Ti was 4.3.

b. Manufacture of a Copolymer of Ethylene and 1-hexene

The operation was carried in a similar reactor as in example 1. The catalyst used was the one described above and the comonomer was 1-hexene.

The fluidised bed of particles of polymer being formed had a height of 5.5 m and the stream of reaction gas mixture passing through it had an upward velocity of 53 cm/s, an absolute pressure of 2.1 MPa and a temperature of 85° C.

The reaction gas mixture comprised, by volume, 19% of ethylene, 4.9% of 1-hexene, 5.1% of hydrogen, and 71% of nitrogen.

The reactor was fed with catalyst prepared previously at a rate of 25 g/h. It was fed separately with triethylaluminium at a rate of 280 mmol/h. Furthermore, it was continuously fed with n-butyl chloride at a rate of 14 mmol/h. The molar ratio of the quantities of n-butyl chloride and triethylaluminium introduced into the reactor was kept at 0.05.

Under these conditions a copolymer free from agglomerate was drawn off at a rate of 163 kg/h, which had a density (non annealed) of 0.915 g/cm3, a titanium content of 6.7 ppm, a Melt-Index MI2.16 of 1.0 g/10 minutes. The catalyst activity was 455 g of polymer per millimole of titanium per hour of reaction and per 0.1 MPa of ethylene pressure.

Example 3 a. Catalyst Preparation

The catalyst was prepared substantially according to example 1 of U.S. Pat. No. 6,140,264 except that tri-n-octyl aluminum was added to the catalyst precursor after the catalyst precursor was contacted with conventional quantities of an electron donor.

b. Manufacture of a Copolymer of Ethylene and 1-butene

The operation was carried in a similar reactor as in example 1. The catalyst used was the one described above and the comonomer was 1-bbutene.

The fluidised bed of particles of polymer being formed had a height of 5 m and the stream of reaction gas mixture passing through it had an upward velocity of 52 cm/s, an absolute pressure of 2.1 MPa and a temperature of 84° C.

The reaction gas mixture comprised, by volume, 47.6% of ethylene, 16.7% of 1-butene, 10.5% of hydrogen, 7.1% of pentane and 18.1% of nitrogen.

The reactor was fed with catalyst prepared previously at a rate of 34 g/h. It was fed separately with triethylaluminium at a rate of 207 mmol/h. Furthermore, it was continuously fed with n-butyl chloride at a rate of 27 mmol/h. The molar ratio of the quantities of n-butyl chloride and triethylaluminium introduced into the reactor was kept at 0.13.

Under these conditions a copolymer free from agglomerate was drawn off at a rate of 254 kg/h, which had a density (non annealed) of 0.918 g/cm3, a titanium content of 0.62 ppm, a Melt-Index MI2.16 of 1.8 g/10 minutes. The catalyst activity was 4140 g of polymer per millimole of titanium per hour of reaction and per 0.1 MPa of ethylene pressure.

Example 4 a. Catalyst Preparation

The catalyst was prepared according the same protocol described in example 3.

b. Manufacture of a Copolymer of Ethylene and 1-hexene

The operation was carried in a similar reactor as in example 1. The catalyst used was the one described above and the comonomer was 1-hexene.

The fluidised bed of particles of polymer being formed had a height of 5.0 m and the stream of reaction gas mixture passing through it had an upward velocity of 52 cm/s, an absolute pressure of 2.1 MPa and a temperature of 88° C.

The reaction gas mixture comprised, by volume, 47.6% of ethylene, 6.5% of 1-hexene, 6.3% of hydrogen, and 39.6% of nitrogen.

The reactor was fed with catalyst prepared previously at a rate of 50 g/h. It was fed separately with triethylaluminium at a rate of 260 mmol/h. Furthermore, it was continuously fed with n-butyl chloride at a rate of 39 mmol/h. The molar ratio of the quantities of n-butyl chloride and triethylaluminium introduced into the reactor was kept at 0.15.

Under these conditions a copolymer free from agglomerate was drawn off at a rate of 307 kg/h, which had a density (non annealed) of 0.918 g/cm3, a titanium content of 0.75 ppm, a Melt-Index MI2.16 of 1.05 g/10 minutes. The catalyst activity was 3133 g of polymer per millimole of titanium per hour of reaction and per 0.1 MPa of ethylene pressure.

The invention claimed is:

1. Process for the gas-phase (co-)polymerization of olefins in a fluidized bed reactor using a Ziegler-Natta catalyst, said process comprising the addition into the reactor of an organoaluminium cocatalyst and of a monohalogenated hydrocarbon compound,
   a. wherein the molar ratio of the monohalogenated hydrocarbon compound to the cocatalyst is comprised between 0.02 and 0.2,
   b. wherein the monohalogenated hydrocarbon compound is added to the reactor in an amount comprised between 0.625 to 40 moles of monohalogenated hydrocarbon compound per mole of transition metal of catalyst introduced into the reactor, and
   c. wherein the monohalogenated hydrocarbon compound is n-butyl chloride.

2. Process according to claim 1 wherein the Ziegler-Natta catalyst is a silica supported Ziegler-Natta catalyst.

3. Process according to claim 1 or 2, wherein the molar ratio of the monohalogenated hydrocarbon compound to the cocatalyst is maintained constant throughout the polymerization.

4. Process according to claim 1, wherein the sole or main olefin is either ethylene or propylene, and the optional comonomer is selected from but-l-ene, pent-l-ene, hex-l-ene, 4-methylpent-l-ene and oct-l-ene.

5. Process according to claim 1, wherein the monohalogenated hydrocarbon compound is diluted in a diluent in an amount comprised between 0.001 and 2 mole of monohalogenated hydrocarbon compound per 1 of diluent.

6. Process according to claim 1, wherein the monohalogenated hydrocarbon compound is not added in admixture with the catalyst.

7. Process according to claim 1, wherein the catalyst is a non-prepolymerized catalyst.

8. Process according to claim 7, wherein the catalyst is a titanium magnesium silica supported catalyst which is directly introduced into the reactor.

9. Process according to claim 1, wherein the cocatalyst is comprised between 0.02 and 0.15.

10. Process according to claim 1, wherein the amount in b. is between 0.625 and 10.

11. Process according to claim 10, wherein the amount in b. is between 0.625 and 5.

12. Process according to claim 5, wherein the diluent is selected from the group consisting of butane, pentane and hexane.

\* \* \* \* \*